(12) United States Patent
Grossmann et al.

(10) Patent No.: US 8,892,336 B2
(45) Date of Patent: Nov. 18, 2014

(54) ACTUATING DEVICE, CONTROLLER FOR OPERATING THE ACTUATING DEVICE AND METHOD FOR OPERATING AN ACTUATING DEVICE

(75) Inventors: Alex Grossmann, Leonberg (DE); Ralf Buehrle, Hochberg (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 1081 days.

(21) Appl. No.: 12/806,468

(22) Filed: Aug. 13, 2010

(65) Prior Publication Data
US 2011/0112744 A1 May 12, 2011

(30) Foreign Application Priority Data
Sep. 11, 2009 (DE) .................. 10 2009 029 394

(51) Int. Cl.
| | |
|---|---|
| F02D 41/18 | (2006.01) |
| F02D 41/26 | (2006.01) |
| F02M 25/07 | (2006.01) |
| F02D 11/10 | (2006.01) |
| F02D 41/24 | (2006.01) |
| B60R 16/023 | (2006.01) |
| F02B 31/06 | (2006.01) |
| F02D 41/14 | (2006.01) |

(52) U.S. Cl.
CPC ........ B60R 16/0231 (2013.01); F02M 25/0756 (2013.01); F02D 2200/0404 (2013.01); Y02T 10/146 (2013.01); F02D 11/106 (2013.01); F02M 25/0773 (2013.01); F02D 2041/1409 (2013.01); F02D 41/2432 (2013.01); F02D 41/2464 (2013.01); F02B 31/06 (2013.01); F02D 41/266 (2013.01)

USPC ........................................... 701/103; 123/399

(58) Field of Classification Search
CPC ........ F02B 29/083; B60W 10/06; F02D 9/02; F02D 11/10; F02D 11/107; F02D 2041/001; F02D 41/0002; F02D 41/26; F02D 41/2422; F02D 41/2467
USPC ........... 701/102–104, 115; 123/396, 399, 403
See application file for complete search history.

(56) References Cited

U.S. PATENT DOCUMENTS

| | | | | |
|---|---|---|---|---|
| 4,940,030 | A * | 7/1990 | Morikawa | 123/198 D |
| 5,983,859 | A * | 11/1999 | Bruedigam et al. | 123/396 |
| 7,194,998 | B2 * | 3/2007 | Fuwa et al. | 123/346 |
| 7,415,966 | B2 * | 8/2008 | Irisawa | 123/431 |
| 8,463,524 | B2 * | 6/2013 | Yamashita | 701/102 |
| 2004/0226537 | A1 * | 11/2004 | Held et al. | 123/324 |
| 2007/0039579 | A1 * | 2/2007 | Fuwa et al. | 123/90.16 |
| 2008/0147301 | A1 * | 6/2008 | Irisawa | 701/103 |
| 2009/0165741 | A1 * | 7/2009 | Kubo et al. | 123/184.55 |
| 2009/0320811 | A1 * | 12/2009 | Gates et al. | 123/568.29 |
| 2010/0012086 | A1 * | 1/2010 | Demura | 123/399 |
| 2012/0010801 | A1 * | 1/2012 | Kato et al. | 701/102 |

\* cited by examiner

*Primary Examiner* — John Kwon
*Assistant Examiner* — Johnny Hoang
(74) *Attorney, Agent, or Firm* — Kenyon & Kenyon LLP

(57) ABSTRACT

An actuating device for providing a physical output quantity includes: a control element for providing the physical output quantity; an actuator unit triggering the control element according to a triggering variable; and a communication unit receiving the triggering variable, which communication unit sends actuator information which contains an indication about a correlation between the provided physical output quantity of the actuating device and the triggering variable.

14 Claims, 1 Drawing Sheet

ACTUATING DEVICE, CONTROLLER FOR OPERATING THE ACTUATING DEVICE AND METHOD FOR OPERATING AN ACTUATING DEVICE

BACKGROUND OF THE INVENTION

1. Field of the Invention

The present invention relates to actuating devices, e.g., actuating devices in a motor vehicle which have a sensor unit for checking their actuating movement, and also relates to triggering of the actuating devices with the aid of a controller.

2. Description of Related Art

Numerous actuating devices are employed in motor vehicles. The actuating devices normally have actuator units, in order to provide a physical output variable as the actuator value, for example an actuator travel, a valve opening, a temperature or the like. In particular in systems having a combustion engine, the throttle valve actuator, the EGR valve (EGR: exhaust gas recirculation), charge movement flaps and similar components may be named as examples of actuating devices.

The actuator unit of an actuating device normally includes a drive (for example, having a DC motor and a gearbox), which activates a control element, for example the throttle valve in the case of a throttle valve actuator. The actuator units may also include other actuators, however, such as piezoelectric elements.

Furthermore, a sensor unit may be provided, which is coupled with the actuator unit in order to read back the actual position of the control element of the actuator unit. The actual position of the control element is normally used to regulate the output variable of the actuator unit with the aid of a controller, for example an adjustment of the position of a throttle valve in the case of a throttle valve actuator.

For interpretation of the sensor data transmitted to the controller by such an actuating device, it is necessary for the sensor unit to be calibrated, or at least matched to the controller, i.e., for it to provide a corresponding defined sensor value in a digital or analog manner for a particular physical variable to be measured. If the sensor unit of the actuating device is modified or replaced by another type over the operating life of the entire system, the controller may require reprogramming in order to regulate the output variable of the actuator unit as a function of the sensor readings. Since reprogramming of the controller is normally expensive, such an actuating device might have to be produced for decades without changes, so that quality improvements, changing of suppliers and other optimizations are not possible.

The same is also true, of course, if the actuator unit of the actuating device or the actuator unit and the sensor unit of the actuating device are modified or replaced by another type over the operating life of the entire system. In order to provide the same output variable, a modified actuator unit must receive a different control variable, so that here too the controller requires reprogramming when the actuating device is replaced in order to set the desired output variable of the actuator unit.

An object of the present invention is to make an actuating device and a controller available, which allow for a proper triggering of the actuator unit to provide a desired output variable, even if the actuator unit or the sensor unit of the actuating device or the entire actuating device is replaced.

Another object of the present invention is to provide a method that allows for various types of actuating devices to be connected to a controller without a need for reprogramming in the controller.

BRIEF SUMMARY OF THE INVENTION

According to a first aspect of the present invention, an actuating device for supplying a physical output variable is provided, in particular for use in a motor vehicle. The actuating device includes:
- a control element for providing the physical output variable;
- an actuator unit for triggering the control element according to a triggering variable;
- a communication unit for receiving the triggering variable, wherein the communication unit is designed to send actuator information which contains an indication of a correlation between the provided physical output quantity of the actuating device and the triggering variable.

One idea of the above actuating device is, in a system having a controller and an actuating device, to receive from the actuating device actuator information about how to trigger an actuator unit of the actuating device in order to bring about a particular physical output variable. In this way, the actuating device can be exchanged for a different one without a need for reprogramming in the controller. That makes it possible to adapt the actuating device over the production period of the entire system, in particular in order to perform successive quality improvements and optimizations.

It is also possible to send as actuator information an actuator function that allows a triggering variable for the actuating device to be generated from a desired output variable for the actuating device for setting the output variable.

In addition, the actuator information may also include additional indications about physical properties of the actuating device and/or a model or part number of the actuating device.

According to one example embodiment, a sensor unit may also be included which is coupled with the control element and/or the actuator unit in order to detect an actual output quantity of the actuating device set by the control element and to provide a sensor value representing the detected output quantity, the communication unit being designed to provide in the actuator information an indication of a correlation between the detected physical output quantity and the sensor value.

The control unit may be designed to receive actuator information and to provide a triggering variable as a function of the received actuator information and of an output variable to be set.

The control unit may also be designed to receive as actuator information an actuator function that allows a triggering variable for the actuating device for setting the output variable to be generated from a desired output variable for the actuating device, and to assign the corresponding triggering variable according to the actuator function to the output variable of the actuating device to be adjusted.

The control unit may also be designed to receive actuator information and to regulate the actuating device to provide a triggering variable, as a function of the received actuator information, of a received sensor variable and of an output variable to be set.

The control unit may be designed to perform the regulation with the aid of a PID regulator, the received actuator information including at least one specification of a regulating parameter, in particular a proportional constant and/or a differential constant and/or an integration constant, the control unit being designed to perform the regulation as a function of the at least one regulating parameter.

According to another aspect, a system having the above actuating device and the above control unit is provided.

According to another aspect, a method is provided for operating an actuating device to provide a physical output variable, in particular for use in a motor vehicle. The method includes the following steps:
- transmitting, by the actuating device, of actuator information which contains an indication of a correlation between the physical output quantity provided by an actuator unit of the actuating device and the triggering variable;
- determining a triggering variable as a function of the received actuator information and of an output variable to be set;
- transmitting the triggering variable to the actuating device;
- operating the actuating device according to the triggering variable.

One idea of the above method is, in a system having a controller and an actuating device, to receive from the actuating device actuator information about how to trigger an actuator unit of the actuating device in order to bring about a particular physical output variable. In this way, the actuating device may be exchanged for a different one without a need for reprogramming in the controller. This makes it possible to adjust the actuating device over the production period of the overall system, in particular in order to perform successive quality improvements and optimizations.

The following additional steps may be provided for the method:
- detecting an actual, output quantity in the actuating device, set by a control element of the actuating device;
- transmitting a sensor variable representing the actual output quantity;
- performing a regulation as a function of the received actuator information, which also contains an indication of a correlation between the detected physical output quantity and the sensor variable, as a function of a received sensor quantity and of an output variable to be set to provide a triggering variable.

DETAILED DESCRIPTION OF THE INVENTION

One example embodiment will be illustrated below on the basis of a throttle valve actuator. However, the following may be similarly applied to other actuating devices, both for actuating devices in an air supply system of a motor vehicle and for other actuating devices.

Figure 1:
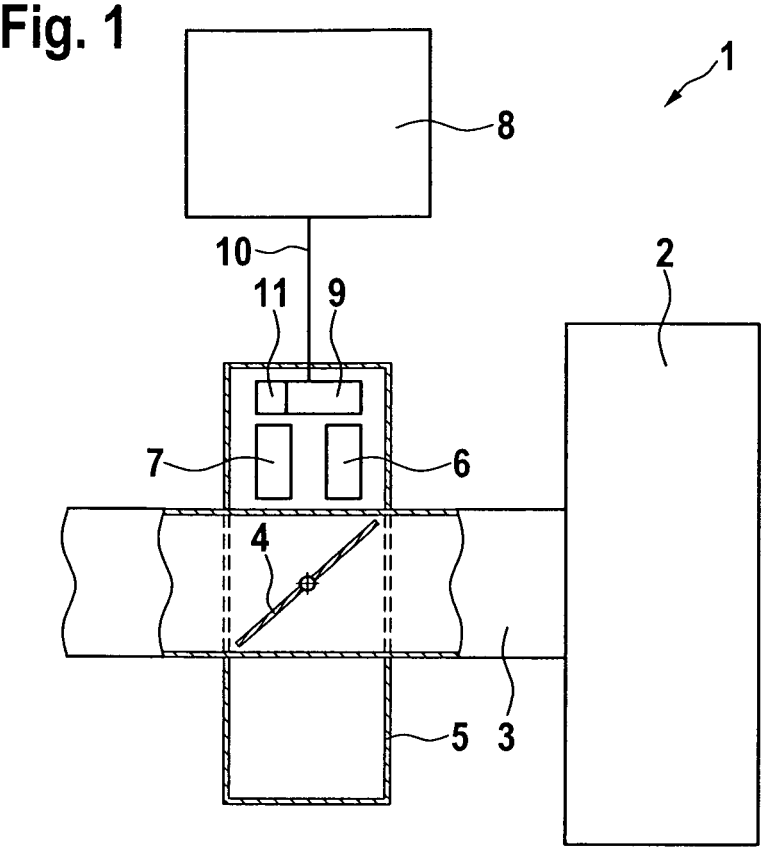
FIG. 1 shows a system having an actuating device and a controller.

FIG. 1 shows a simplified illustration of an engine system 1, having a combustion engine 2 to which air is supplied via an air supply system 3. A throttle valve 4 is situated in air supply system 3 as a control element. Throttle valve 4 is provided inside a throttle valve actuator 5. Throttle valve actuator 5 includes an actuator unit 6 and may include a drive motor and an appropriate gearbox (not shown), in order to actuate throttle valve 4 with the aid of the drive motor. Actuator unit 6 performs a positioning motion of throttle valve 4, as a function of a provided triggering variable.

In addition, throttle valve actuator 5 may include a sensor unit 7, which is coupled with throttle valve 4 in order to ascertain the setting position of throttle valve 4, i.e., the output quantity of throttle valve actuator 5. The ascertained setting position is provided as a corresponding sensor quantity, which indicates the detected position of throttle valve 4.

Throttle valve actuator 5 has a communication unit 9 which is connected to a control unit 8 via a communication connection 10; communication unit 9 receives data from and transmits data to control unit 8. To be able to exchange throttle valve actuator 5, the provided communication connection is preferably able to be disconnected, for example by providing a suitable plug connection, so that it is possible to exchange actuating device 5 in a simple manner.

Control unit 8 is designed to transmit an appropriate triggering variable to actuator unit 6 of throttle valve actuator 5, and to trigger the actuator by, or according to, the triggering variable in order to obtain a desired throttle valve position as the output variable. Actuator unit 6 may be triggered by an analog triggering variable or by a digital triggering variable. In the case of a digital triggering variable, the latter may be converted in actuator unit 6 to an analog triggering signal, for example by a digital-analog conversion and the like, and the drive unit located therein may be triggered accordingly. The conversion of a triggering variable into a particular physical output variable such as a positioning motion or a movement to a certain setting position differs from one throttle valve actuator to another, and may differ both in the case of throttle valve actuators of similar construction and of differing types of throttle valve actuators.

That is to say, if an actuator unit 6 is to be triggered by control unit 8, in order to set a certain setting position or a certain setting motion of throttle valve 4, it is then necessary for control unit 8 to know the actuator function, i.e., a function that assigns a triggering variable to a control variable. For this reason, throttle valve actuator 5, in particular a communication unit 9, communicates to control unit 8 actuator information which includes actuator data. The actuator information enables control unit 8 to properly trigger actuator unit 6, i.e., to properly provide the triggering variable, regardless of the actuating device 5 being used.

The transmission of the actuator information may be carried out the first time the connection is established between controller 8 and throttle valve actuator 5, at regular points in time, or at predefined points in time. For example, the actuator information may be transmitted when controller 8 is switched on. The transmission of the actuator information may be triggered for example by controller 8 by transmitting a query signal via communication connection 10 to actuating device 6, whereupon communication unit 9 transmits the actuator information to control unit 8. The received actuator information may be saved in control unit 8, either permanently or temporarily. If it is saved permanently, transmission of the actuator information when throttle valve actuator 5 is first connected to control unit 8 is sufficient.

Furthermore, throttle valve actuator 5 may include one or more sensor units 7, depending on the type or model, and may provide information about one or more sensor variables including in this case the information about the throttle valve position or throttle valve motion. For proper interpretation in control unit 8 of the sensor quantity to be transmitted by communication unit 9 to control unit 8, it is necessary for control unit 8 to always have access to sensor information, which may specify in control unit 8 the manner in which the sensor quantity is to be interpreted. The sensor quantity may be transmitted by communication unit 9 to control unit 8 in a digital or analog manner. The actuator information is saved for example in a storage unit 11 in communication unit 9; it is ascertained through appropriate measurements when actuating device 5 is being manufactured, and is written into storage unit 11 in the form of individual values, lookup tables, stored functions, in particular transmission functions and the like.

Since the sensor quantities must be interpreted in a different way in control unit 8 for different sensor units 7, it is provided that sensor unit 7 transmits via communication unit 9 to control unit 8 sensor information in the actuator information which specifies the manner in which the sensor quantity provided by sensor unit 7 is assigned to the detected quantity, i.e., the measured throttle valve position or the measured throttle valve motion. In this way, even when sensor units 7 are modified or replaced, i.e., for example when throttle valve actuators 5 are exchanged due to a failure or for purposes of maintenance, the throttle valve position or throttle valve motion may be made available in control unit 8 without a need for reprogramming control unit 8. The actuator information which contains the sensor information may be transmitted by storage unit 11 via communication unit 9 when control unit 8 is switched on, when controller 8 is connected to throttle valve actuator 5, at regular points in time or at predefined points in time.

In particular, it may be provided that control unit 8 makes available a control quantity, for example the throttle valve position or throttle valve motion to trigger actuator unit 6 of throttle valve actuator 5, in a standardized or normalized format. The actuator information may be provided for example as a specification regarding an actuator function, using which the normalized control variable in control unit 8 may be converted into a corresponding triggering variable for actuator unit 6 of actuating device 5, so that actuator unit 6 converts the received triggering quantity into the desired output quantity which is to be set, for example the throttle valve position, according to an actuator transmission function.

Similarly, it may be provided that the sensor information received in control unit 8 includes information about a sensor function (sensor transmission function), which converts a sensor quantity provided by sensor unit 7 into a corresponding normalized or standardized sensor value specification, for example a measured throttle valve position or throttle valve motion taken by throttle valve 4.

When actuator unit 6 and sensor unit 7 are coupled together, a regulation is often implemented in control unit 8, which triggers actuator unit 6 in order to provide a desired output quantity. At the same time, sensor unit 7 monitors the set output quantity and regulates actuator unit 6, so that any deviation of the actual output quantity from the desired output quantity is balanced out. The case described above involves a position regulation for the position of throttle valve 4.

The position regulation includes, for example, a PID regulator, i.e., a regulator having proportional, differential, and integral components. To perform a regulation, regulating parameters must be defined, which also take into account, along with the illustrative functions of actuator unit 6 and of sensor unit 7 described above (sensor function, actuator function), the response behavior, response times and other dynamic characteristics of actuator unit 6 and sensor unit 7.

Since throttle valve actuator 5 with actuator unit 6 and sensor unit 7 is always replaced completely in these cases as an integral component, the corresponding regulating parameters of a regulation implemented using this throttle valve actuator 5, such as a proportional constant, a differential constant, and an integration constant, may be transmitted exclusively or additionally as information to be transmitted to control unit 8. The corresponding regulating parameters are communicated to control unit 8 via the actuator information and accepted into control unit 8, so that the latter carries out the regulation of actuator unit 6 of throttle valve actuator 5. In this way, the regulation implemented in controller 8 may also be carried out using a modified throttle valve actuator 5.

The regulating parameters reflect the transmission characteristic curve between the set and/or the detected output quantity and the triggering quantity or the sensor quantity, as well as response times and response behavior of actuator unit 6 and sensor unit 7, so that controller 8 is able to perform the position regulation despite throttle valve actuator 5 having been modified or replaced by a new type. Furthermore, for example, the position of the limit stops on throttle valve actuator 5, as well as physical properties such as resistance, inductance, current consumption and the like, may be transmitted to control unit 8 as information which is useful for control unit 8. A type or part number and a serial number may of course also be transmitted.

Figure 2:
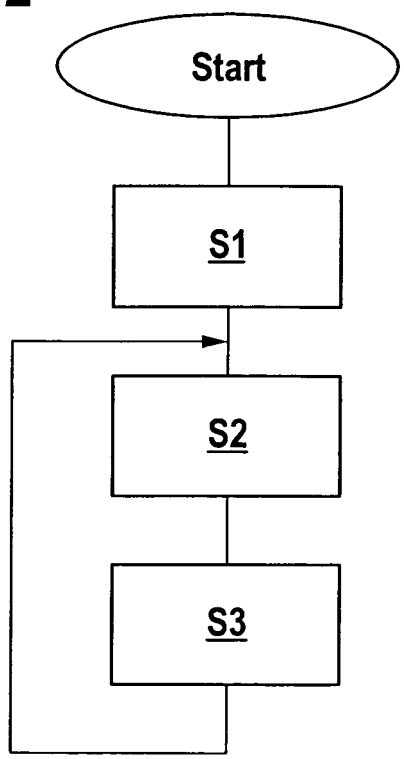
FIG. 2 shows a flow chart to illustrate the sequence of the method for operating the actuating device with the aid of actuator information provided by the actuating device.

FIG. 2 depicts in summary the method which is carried out between control unit 8 and actuating device 5. Step S1 provides for transmission of the predefined actuator information saved in actuating device 5 from actuating device 5 to control unit 8. The actuator information may contain the actuator function and/or the sensor function and/or the regulating parameters, as described above.

Next, in step S2 a triggering quantity is determined in control unit 8 as a function of the received actuator information and of an output quantity which is to be set. The output quantity to be set results from internal calculations in control unit 8, or is provided externally to control unit 8.

In step S3, the triggering quantity is transmitted to actuating device 5 by control unit 8, so that actuator unit 6 of actuating device 5 operates the latter according to the triggering quantity. For constant adjusting of actuating device 5 by control unit 8, steps S2 and S3 are carried out cyclically. In contrast, the actuator information only has to be transmitted once, if it may be assumed that it does not change over the period of operation.

The idea underlying the present invention is not limited to a throttle valve actuator, but extends to every type of actuating device in which an analog or digital triggering quantity is converted into a physical output quantity, such as motion, position, temperature and the like. In particular, the idea may be applied to actuating devices in which the setting of the physical control variable is monitored by an appropriate sensor, in order to preferably be able to perform a regulation of actuator unit 6 using a triggering quantity. On the whole, the system described above makes it possible to exchange actuating device 5 at any point in time and to replace it with a modified actuating device 5. At the same time, the regulation of actuator unit 6 for providing a desired output quantity may continue to be performed by control unit 8, without control unit 8 having to be modified or reprogrammed. This greatly simplifies the replacement of individual actuating devices in a complete system.

What is claimed is:
1. A machine comprising:
an operating unit configured to be set in a plurality of alternative physical states to perform respective corresponding physical operations;
an actuator unit configured to trigger the operating unit to be set to one of the physical states depending on a value of a triggering variable; and
a communication unit configured to:
receive the triggering variable from a control unit;
provide the received triggering variable to the actuator unit; and
send actuator information to the control unit, wherein the actuator information indicates a correlation between different ones of the physical operations to different values of the triggering variable.

2. The machine as recited in claim 1, wherein an actuator function is transmitted as the actuator information, and wherein the actuator function, when executed, generates, from a desired output quantity to be achieved by the physical operation of the operating unit, a respective value of the triggering variable.

3. The machine as recited in claim 2, wherein the actuator information further includes additional specifications about at least one of (i) physical properties of the machine, (ii) a type of the machine, and (iii) a part number of the machine.

4. The machine as recited in claim 2, wherein the operating unit includes a throttle valve in an air supply system of a combustion engine.

5. The machine as recited in claim 2, further comprising:
a sensor unit coupled to at least one of the operating unit and the actuator, and configured to thereby detect an actual physical output quantity or state of the actuating device and provide a sensor variable representing the detected physical output quantity or state;
wherein the communication unit is configured to provide in the actuator information an indication about a correlation between the detected physical output quantity or state and the sensor variable.

6. The machine as recited in claim 5, wherein the communication unit includes a storage unit in which the detected output quantity is stored.

7. The machine as recited in claim 6, wherein the machine is disconnectable from the control unit.

8. The machine as recited in claim 1, further comprising:
a communication connection to the control unit, which communication connection is disconnectably attached to the communication unit.

9. An actuator system, comprising:
an actuating device for providing a physical output variable, including:
a control element configured to provide the physical output variable;
an actuator unit configured to trigger the control element according to a triggering variable; and
a communication unit configured to receive the triggering variable, wherein the communication unit is further configured to send actuator information which contains an indication of a correlation between different states of the physical output variable of the actuating device and different values of the triggering variable; and
a master control unit for operating the actuating device, wherein the master control unit is configured to (i) receive the actuator information and (ii) provide the triggering variable as a function of at least the received actuator information and an output quantity to be set.

10. The actuator system as recited in claim 9, wherein the master control unit is configured to receive an actuator function as the actuator information, and wherein the actuator function is able to generate the triggering variable for the actuating device from a desired output quantity for the actuating device.

11. The actuator system as recited in claim 9, wherein:
the actuating device further includes a sensor unit coupled to at least one of the control element and the actuator unit in order to detect an actual output quantity of the actuating device and to provide a sensor variable representing the detected output quantity, and the communication unit is configured to provide in the actuator information an indication about a correlation between the detected physical output quantity and the sensor variable; and
the master control unit is configured to (i) receive the actuator information, and (ii) perform a regulation of the actuating device for providing the triggering variable as a function of the received actuator information, the sensor variable and the output quantity to be set.

12. The actuator system as recited in claim 11, wherein the received actuator information includes at least one of regulating parameters, and wherein the regulating parameters include a proportional constant, a differential constant, and an integration constant, and wherein the master control unit is configured to perform the regulation of the actuating device with the aid of a PID regulator as a function of the at least one of the regulating parameters.

13. A method for operating an actuating device for providing a physical output quantity, comprising:
transmitting from the actuating device an actuator information containing an indication regarding a correlation between different states of the physical output quantity provided by an actuator unit of the actuating device and different values of a triggering variable;
determining the triggering variable as a function of the received actuator information and an output quantity to be set;
transmitting the triggering variable to the actuating device; and
operating the actuating device according to the received triggering variable.

14. The method as recited in claim 13, further comprising:
detecting, using a sensor, an actual output quantity in the actuating device, set by a control element of the actuating device;
transmitting a sensor variable representing the actual output quantity; and
providing the triggering variable as a function of the received actuator information, the sensor variable and the output quantity to be set, wherein the actuator information further provides an indication about a correlation between the detected physical output quantity and the sensor variable.

* * * * *